Patented Aug. 3, 1943

2,326,095

UNITED STATES PATENT OFFICE 2,326,095

BROMINATED ACRYLONITRILE AND METHOD OF PREPARING THE SAME

James D. D'Ianni, Akron, Ohio, assignor to Wingfoot Corporation, Akron, Ohio, a corporation of Delaware No Drawing. Application December 12, 1940, Serial No. 369,802

12 Claims. (Cl. 260—83)

This invention relates to new compositions of matter containing bromine and to a method of preparing the same. More particularly, it relates to brominated acrylonitriles and polymers thereof.

Many unsaturated compounds have been proposed and used for polymerization to produce plastic masses, among these being certain derivatives of acrylic acid. In particular, acrylonitrile has been copolymerized with butadiene or other monomers to yield rubber-like compositions. It has now been found that brominated acrylonitriles are also valuable in polymeric compositions.

The compounds to which the invention relates may be described as mono bromine substituted acrylonitriles, including mono bromine alpha hydrocarbon substituted acrylonitriles. These are embraced by the general formula $$\underset{R\phantom{=}\;R'}{CH=C-CN}$$

where R is hydrogen or bromine and R' is hydrogen, bromine, alkyl, aryl or aralkyl, one and only one bromine atom being present in the compound. Representative compounds, but to which the invention is not limited, are alpha-bromoacrylonitrile, beta-bromoacrylonitrile, alpha-methyl, beta bromoacrylonitrile (cis and trans isomers), alpha-ethyl, beta-bromoacrylonitrile, alpha-propyl, beta-bromoacrylonitrile, alpha-isopropyl, beta-bromoacrylonitrile and alpha-phenyl, beta-bromoacrylonitrile. The invention also includes within its scope other similar compounds where the hydrocarbon substituent, if present, is on the alpha carbon atom of the acrylonitrile and where the bromine may be on either the alpha or beta carbon atom but not on both. Where the acrylonitrile carries a hydrocarbon substituent on the alpha carbon atom, the bromine atom will necessarily be on the beta carbon atom. The mono-bromo acrylonitriles in the monomeric state are usually liquids under atmospheric conditions and are generally colorless but inclined to turn brown on standing. They polymerize readily and are useful in the preparation of polymerized masses, as will appear hereinafter.

These compounds may be prepared by various suitable methods. For example, alpha-bromoacrylonitrile may be prepared by the slow distillation of dibromopropionitrile or by the chemical removal of HBr from dibromopropionitrile, this being accomplished by the use of tertiary amines, such as pyridine, trimethyl amine, picoline and quinoline. The reaction is as follows:

$$CH_2Br-CHBr-CN \rightarrow CH_2=CBr-CN+HBr$$

The physical properties of alpha-bromoacrylonitrile are as follows: B. P. 113–117° C./730 mm.; density $d^{25}_{25}$ 1.596; and refractive index $N^{28}_D$ 1.4758.

The alpha-bromoacrylonitrile was tested for its utility in formation of polymerized masses by treating a mixture of 40% of the nitrile and 60% of butadiene in an emulsion containing the following additional ingredients:

| | |
|---|---|
| $NaBO_3.4H_2O$ | gram__ 0.144 |
| $CCl_4$ | do___ 0.48 |
| 5% Aquarex D solution | cubic centimeters__ 10.00 |
| Citrate phosphate buffer | do___ 10.00 |

The following results were obtained:

| Buffer pH | Temp. | Time | Yield |
|---|---|---|---|
| | °C. | Hours | Per cent |
| 4.7 | 50 | 70 | 52.2 |
| 8.85 | 50 | 70 | 57.4 |

A product of considerable toughness was obtained.

The above polymerization is illustrative only and any of the mono bromoacrylonitriles may be polymerized either alone or with butadiene or with other monomeric materials, in accordance with the various methods known to the art, as by action of ultraviolet light in the presence or absence of a solvent or in an aqueous medium containing an emulsifying agent. Thus, a bromoacrylonitrile and one or two or more of the materials set forth below may be mixed and copolymerized in an emulsion such as that described above or a similar emulsion. Temperatures from room temperature up to as high as 80° C. may be employed for the polymerization with butadiene or for any of the other monomeric mixtures, a temperature in the neighborhood of 50° C. being preferred. A few hours to a few days may be required to produce the desired polymer. The emulsifying agent may be Aquarex D, Gardinol AA, Wetanol, Nekal BX, etc. An oxidizing agent should preferably be present, such as benzoyl peroxide, sodium perborate or hydrogen peroxide. The other monomers which may be combined with a mono bromoacrylonitrile include:

- Isoprene
- Dimethyl butadiene
- Styrene
- Chlorobutadiene
- Vinyl naphthalene
- Vinyl furane
- Esters of acrylic and methacrylic acid
- Vinyl methyl ketone
- Methyl isopropenyl ketone
- Cyanobutadiene
- Acrylonitrile
- Methacrylonitrile
- Phenyl butadiene
- Methyl 1,3-pentadiene
- Vinyl ethers
- Chlorostyrenes
- Alkyl styrenes The two monomers may be present in any proportion, a useful range being from 20 to 80% of the bromoacrylonitrile and, correspondingly, from 80 to 20% of the other monomer.

The self-polymers of the mono-bromo acrylonitriles are amorphous solids, generally of a brownish tint, for example, the self-polymer of alpha-bromo acrylonitrile is a reddish-brown solid. The copolymers with various of the monomers set forth above are rubber-like in those cases where the other monomer, such as butadiene, predominates and therefore are intended for use in place of natural rubber. Since they also resist attack by hydrocarbons to various degrees, they may be used for articles which come in contact with oil or gasoline, a use for which natural rubber is not suitable. Those copolymers which do not possess rubber-like properties may be dissolved in a solvent and employed in making films or coatings.

While there has been described above the preferred embodiment of the invention, it will be apparent to those skilled in the art that various modifications and changes may be made therein without departing from the spirit of the invention or from the scope of the appended claims.

I claim:

1. Compounds of the general formula

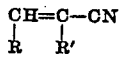

where R is selected from the group consisting of hydrogen and bromine and R' is selected from the group consisting of hydrogen, bromine, alkyl, aryl and aralkyl, one and only one bromine atom being present in the compound.

2. The mono bromoacrylonitriles.
3. Beta-bromoacrylonitrile.
4. Alpha-bromoacrylonitrile.
5. Alpha-alkyl, beta-bromoacrylonitrile.
6. Alpha-methyl, beta-bromoacrylonitrile.
7. A polymerized mono bromoacrylonitrile.
8. Copolymers of a compound of the general formula

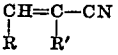

where R is selected from the group consisting of hydrogen and bromine and R' is selected from the group consisting of hydrogen, bromine, alkyl, aryl, and aralkyl, one and only one bromine atom being present in the compound and another monomeric substance containing a

grouping.

9. Copolymers of beta-bromoacrylonitriles and a butadiene.
10. Copolymers of beta-bromoacrylonitrile and butadiene.
11. Copolymers of alpha-bromoacrylonitrile and a butadiene.
12. Copolymers of alpha-bromoacrylonitrile and butadiene.

JAMES D. D'IANNI.